United States Patent [19]

Lee et al.

[11] Patent Number: 5,410,878
[45] Date of Patent: May 2, 1995

[54] AUTOMATIC WARMING-UP APPARATUS AND METHOD THEREOF IN HYDRAULIC SYSTEM

[75] Inventors: Chang-Soo Lee, Changwon; Jang-Wook Cho, Chungmoo; Book-Ho Sin, Sahah, all of Rep. of Korea

[73] Assignee: Samsung Heavy Industry Co., Ltd., Seoul, Rep. of Korea

[21] Appl. No.: 234,226

[22] Filed: Apr. 28, 1994

[30] Foreign Application Priority Data

Jun. 30, 1993 [KR] Rep. of Korea .................. 1993-12149

[51] Int. Cl.⁶ ........................ F16D 31/00; F04B 49/00
[52] U.S. Cl. ....................... 60/327; 60/329; 60/431; 417/32; 417/34
[58] Field of Search ............... 91/459, DIG. 1, 911, 91/906; 60/325, 327, 329, 912, 431; 417/32, 34

[56] References Cited

U.S. PATENT DOCUMENTS

| | | | |
|---|---|---|---|
| 5,199,326 | 4/1993 | Iwatsuki et al. | 60/329 X |
| 5,251,440 | 10/1993 | Bong-Dong et al. | 60/431 X |
| 5,352,095 | 10/1994 | Tanaka et al. | 417/32 X |

FOREIGN PATENT DOCUMENTS

0043327 2/1987 Japan ........................... 60/431

OTHER PUBLICATIONS

English Abstract of Japan 60-119342, Jun. 1985.
English Abstract of Japan 62-167922, Jul. 1987.
English Abstract of Japan 60-147851, Aug. 1985.

*Primary Examiner*—Edward K. Look
*Assistant Examiner*—Hoang Nguyen
*Attorney, Agent, or Firm*—Lieberman & Nowak

[57] ABSTRACT

An automatic warming-up apparatus and a warming-up method applied in various hydraulic systems which are equipped with an engine and a hydraulic pump driven by the engine, and controlled by a microcomputer. The warming-up apparatus has at least one hydraulic actuator operated by an oil discharged from the hydraulic pump, a first temperature sensor detecting the temperature of a lubricant oil of the engine, a second temperature sensor detecting the temperature of a cooling water of the engine, a third temperature sensor detecting the temperature of a pressurized oil of the hydraulic system, an input/output unit sending to the controller the temperature signals received from the sensors.

4 Claims, 2 Drawing Sheets

AUTOMATIC WARMING-UP APPARATUS AND METHOD THEREOF IN HYDRAULIC SYSTEM

BACKGROUND OF THE INVENTION

1. Field of the Invention

The present invention relates to an automatic warming-up apparatus and a method thereof in hydraulic system, and more particularly, to an automatic warming-up apparatus and a method thereof applied in various hydraulic systems which are equipped with an engine and a hydraulic pump driven by the engine, and controlled by a microcomputer.

2. Description of the Prior Art

The conventional hydraulic system is provided with an engine and a hydraulic pump driven by the engine, and operated by supplying a discharge oil of the hydraulic pump to one or a plurality of hydraulic actuators.

In such a system, since lubricant oil and pressurized oil are not warmed up enough right after starting the system, there has been problems that the overall system including the engine and the hydraulic components becomes overstrained when the load is acted on the hydraulic actuator. Accordingly, it has been usually warmed up for a certain amount of time right after starting the system.

The conventional warming-up methods in hydraulic system are disclosed in Japanese utility model laid-open No. 80-85329, No. 85-147852, and Japanese patent laid-open No. 85-119342, and No. 87-167922.

In general, these methods include the method in which the warming-up is performed until the operation can be done with 100% load by increasing manually the rotation speed of the engine or controlling the discharge pressure and the discharge oil amount of the hydraulic pump, and the method in which an instruction is given by a controller so that the engine is warmed-up until the appropriate number of rotation is reached and, at the same time, the discharge pressure and the discharge oil amount of the hydraulic pump are adjusted based on the allowable output of the engine which is determined by detecting the rack position of a fuel supply pump through a sensor.

However, the manual warming-up method has problem that it is not only inaccurate but toilsome, and the automatic warming-up method has problems of the difficult initial adjustment of the sensor for detecting the rack position, an aging due to the use for a long period, and a weak environmental durability since it is installed in the inside of the engine.

SUMMARY OF THE INVENTION

It is an object of the present invention to provide an automatic warming-up apparatus and a method thereof in a hydraulic system to solve the conventional problems described in the above.

It is another object of the present invention to provide an automatic warming-up apparatus and a method thereof in a hydraulic system with a stable performance, a low manufacturing cost, and an improved reliability.

According to one aspect of the present invention, there is provided an automatic warming-up apparatus in a hydraulic system, comprising: an engine; a hydraulic pump driven by said engine; at least one hydraulic actuator operated by an oil discharged from said hydraulic pump; a controller controlling the rotation speed of said engine and the discharge oil amount and pressure of said hydraulic pump; a first temperature sensor detecting the temperature of a lubricant oil of said engine; a second temperature sensor detecting the temperature of a cooling water of said engine; a third temperature sensor detecting the temperature of a pressurized oil of said hydraulic system; an input/output unit sending to said controller the temperature signals received from said sensors; and said controller controlling the rotation speed of said engine and the discharge oil amount and pressure until said temperature signals reach predetermined values.

According to another aspect of the present invention, there is provided a method for an automatic warming-up in a hydraulic system comprising an engine, a hydraulic pump driven by said engine, at least one hydraulic actuator operated by an oil discharged from said hydraulic pump, and a controller controlling the rotation speed of said engine and the discharge oil amount and pressure of said hydraulic pump, comprising the steps of: detecting the temperature of a lubricant oil of said engine, the temperature of a cooling water of said engine and the temperature of a pressurized of said hydraulic system; sending the temperature signals to said controller; determining whether or not a warming-up is performed by comparing said temperature signals with predetermined temperature values; performing either a normal operation in case said temperature signals are above said predetermined values or a warming-up operation in case said temperature signals are below said predetermined values by controlling the rotation speed of said engine and the discharge oil amount and pressure of said hydraulic pump.

DETAILED DESCRIPTION OF THE PREFERRED EMBODIMENTS

In the following, one preferred embodiment of the present invention will be described in detail with reference to the accompanying drawings.

Figure 1:
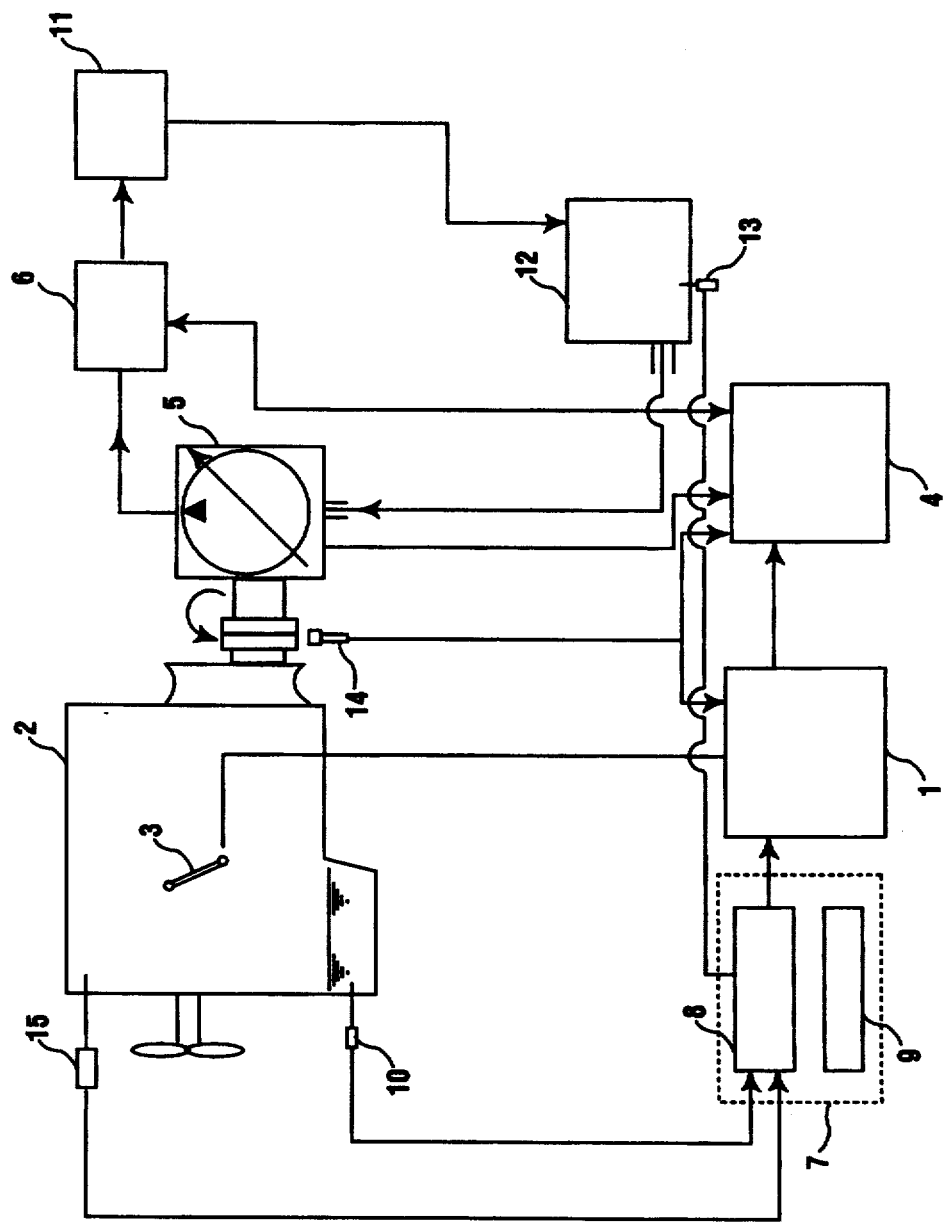
FIG. 1 is a schematic block diagram illustrating an automatic warming-up apparatus according to one embodiment of the present invention.

FIG. 1 illustrates an automatic warming-up apparatus according to one embodiment of the present invention. As shown in FIG. 1, a hydraulic system employing the automatic warming-up apparatus of this embodiment has an engine 2, a hydraulic pump 5 driven by the engine 2, a hydraulic valve 6 for supplying selectively the discharged oil from a hydraulic pump 5 to a corresponding hydraulic actuator 11, an engine controller 1 for controlling the engine 2 by the operation amount of a throttle lever 3 and the speed signal received from a rotation speed sensor 14 of the engine 2, and a pump controller 4 for controlling variably the discharge pressure, the discharge oil amount of the hydraulic pump 5 and the direction of the hydraulic valve 6 by the control signal received from the engine controller 1.

Reference numeral 12 is an oil tank.

The scope of the present invention does not limit to the hydraulic system described in the above which illustrates the only one embodiment of the present invention. In other words, the automatic warming-up apparatus of the present invention can be applied for various types of hydraulic systems, for example, the engine controller and the pump controller can be consisted of a single controller containing a microcomputer.

The automatic warming-up apparatus of this embodiment has a first temperature sensor 10 for detecting the temperature of lubricant oil of the engine 2, a second temperature sensor 15 for detecting the temperature of cooling water of the engine 2, a third temperature sensor 13 for detecting the temperature of pressurized oil in the oil tank 12, and an input/output unit for sending to the engine controller 1 the temperature signals (i.e. the temperature signals of lubricant oil, cooling water, and pressurized oil) received from the sensors 10, 15 and 13, respectively.

It is preferable that a display unit(9: monitor) is connected to the input/output unit 8 so that the temperature signals are displayed in distinguished forms.

Figure 2:
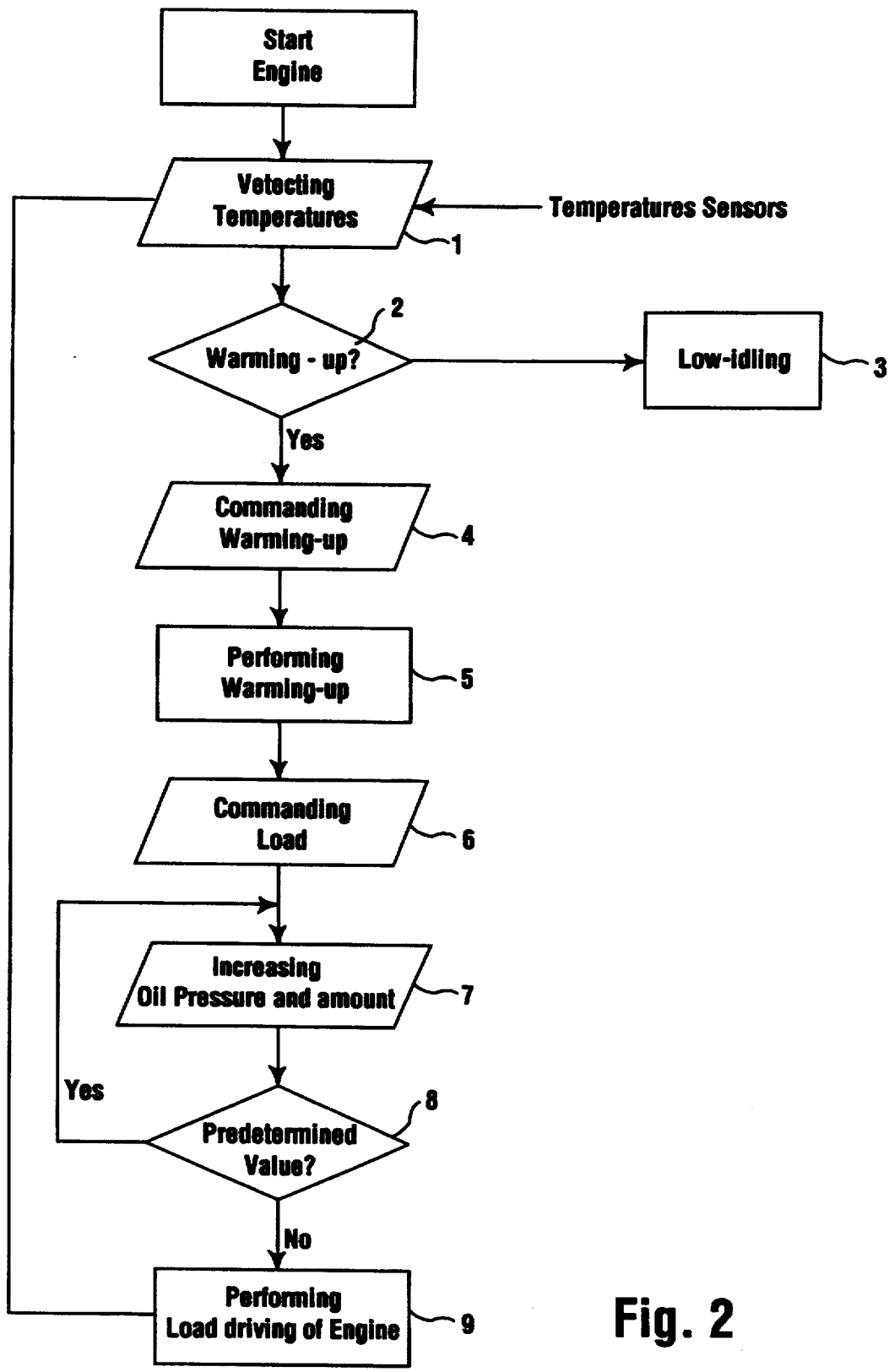
FIG. 2 is a flow diagram illustrating a warming-up process of the apparatus according to FIG. 1.

In the following, the operation process of the automatic warming-up apparatus according to this embodiment will be described with reference to FIG. 2.

After the engine 2 is put to start, the lubricant oil temperature signal, cooling water temperature and pressurized oil temperature signal detected from the first temperature sensor 10, the second temperature sensor 15 and the third temperature sensor 13 respectively, are sent to the engine controller 1 through the input/output unit 8(1st step).

The engine controller 1 determines whether or not the warming-up is performed by comparing the temperature signals from the temperature sensors 10, 13 and 15 with predetermined values(2nd step).

According to the result of the 2nd step, if the temperatures are high enough, i.e., above the predetermined values, the 9th step is immediately proceeded to carry out low-idling operation.

On the other hand, according to the result of the 2nd step, if the temperatures are below the predetermined values, an instruction is given to the engine 2 for warming-up(3rd step). This warming-up instruction is accomplished by sending the control signal to the throttle lever 3 so that the engine 2 is driven by the predetermined rotation speed(4th step).

The pump controller 4, according to the instruction from the engine controller(5th step), slowly increases the discharge oil amount and pressure of the hydraulic pump 5 and hydraulic valve 6 until the change rate in the rotation speed of the engine 2 reaches the predetermined values(6th step). At this time, the change rate in the rotation speed of the engine 2 is determined by the maximum load capacity of the engine 2 required by the hydraulic actuator 11.

The 7th step determines whether or not the discharge oil amount and pressure increased in the 6th step have reached the predetermined change rate in the rotation speed of the engine 2. If the increased discharge oil amount and pressure have not reached the predetermined value, the process goes back to the 6th step and increases further the discharge oil amount and pressure.

If the increased discharge oil amount and pressure have reached the predetermined value, the operation of the engine 2 is continued, and simultaneously, the temperature signals are detected again by going back to the 1st step(8th step).

Thus, the engine and the hydraulic pump in the hydraulic system can be warmed up effectively by carrying out the above process repeatedly.

As described in the above, the automatic warming-up apparatus of the present invention is applied in the hydraulic system with a stable performance, a low manufacturing cost, and a greatly improved reliability.

What is claimed is:

1. An automatic warming-up apparatus in a hydraulic system, comprising:
    an engine;
    a hydraulic pump driven by said engine;
    at least one hydraulic actuator operated by an oil discharged from said hydraulic pump;
    a controller controlling the rotation speed of said engine and the discharge oil amount and pressure of said hydraulic pump;
    a first temperature sensor detecting the temperature of a lubricant oil of said engine;
    a second temperature sensor detecting the temperature of a cooling water of said engine;
    a third temperature sensor detecting the temperature of a pressurized oil of said hydraulic system;
    an input/output unit sending to said controller the temperature signals received from said sensors; and
    said controller controlling the rotation speed of said engine and the discharge oil amount and pressure until said temperature signals reach predetermined values.

2. The automatic warming-up apparatus of claim 1, further comprising:
    a display unit connected to said input/output unit so that said temperature signals are displayed in distinguished forms.

3. A method for an automatic warming-up in a hydraulic system comprising an engine, a hydraulic pump driven by said engine, at least one hydraulic actuator operated by an oil discharged from said hydraulic pump, and a controller controlling the rotation speed of said engine and the discharge oil amount and pressure of said hydraulic pump, comprising the steps of:
    detecting the temperature of a lubricant oil of said engine, the temperature of a cooling water of said engine and the temperature of a pressurized of said hydraulic system;
    sending the temperature signals to said controller;
    determining whether or not a warming-up is performed by comparing said temperature signals with predetermined temperature values;
    performing either a normal operation in case said temperature signals are above said predetermined values or a warming-up operation in case said temperature signals are below said predetermined values by controlling the rotation speed of said engine and the discharge oil amount and pressure of said hydraulic pump.

4. The method of claim 3, wherein said fourth step comprising the step of:
    controlling the rotation speed of said engine to be below a predetermined rotation speed value, and the discharge oil amount and pressure of said hydraulic pump to be increased relatively slowly until the change rate of the rotation speed of said engine reaches said predetermined rotation speed value, when said temperature signals are below said predetermined values.

* * * * *